Dec. 7, 1937.     H. KETCHAM     2,101,741
COLOR ANALYZING APPARATUS
Filed July 3, 1936     2 Sheets-Sheet 1
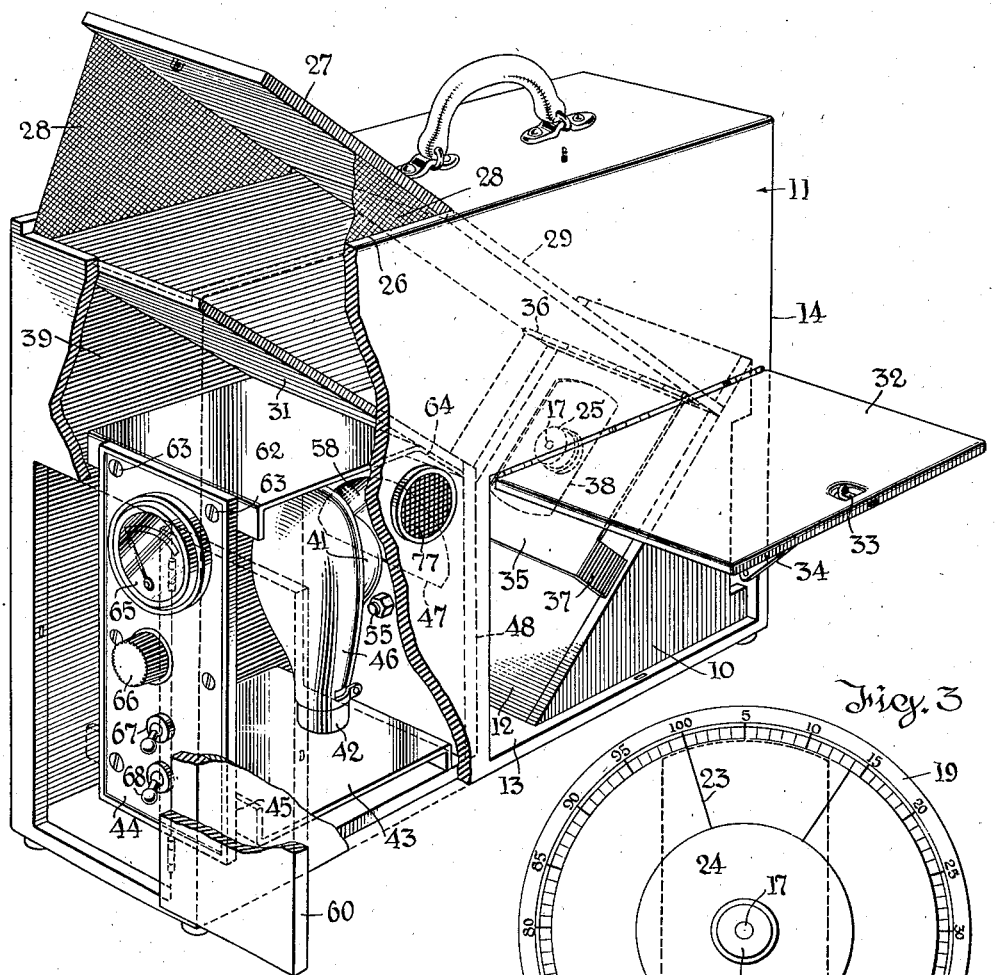
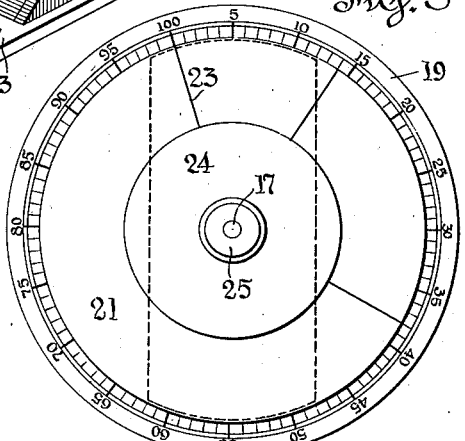
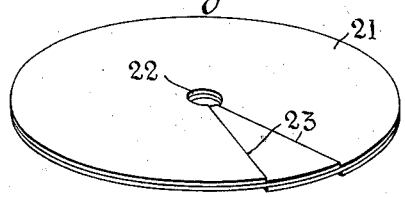
Inventor:
Howard Ketcham,
By
Dodge and Sons,
Attorneys

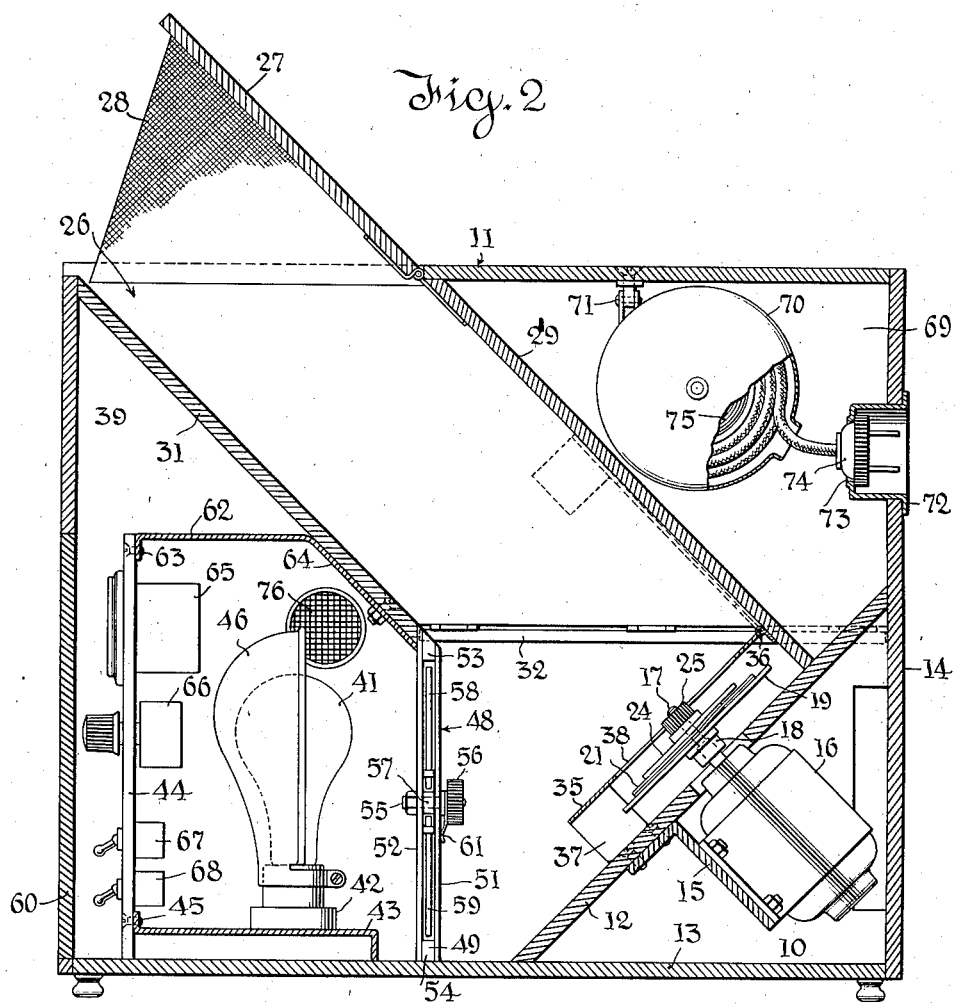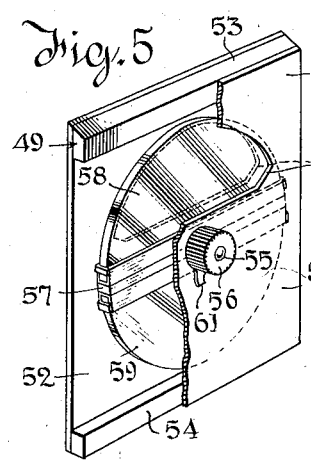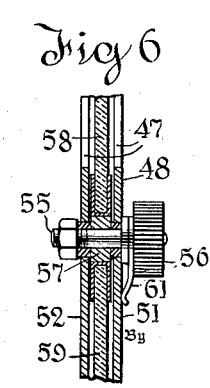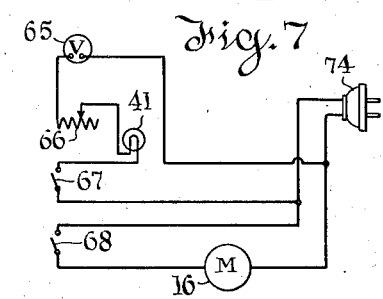

Patented Dec. 7, 1937

2,101,741

UNITED STATES PATENT OFFICE 2,101,741

COLOR ANALYZING APPARATUS

Howard Ketcham, New York, N. Y.

Application July 3, 1936, Serial No. 88,882

7 Claims. (Cl. 88—14)

This invention relates to color analyzing apparatus, and particularly to apparatus for viewing color samples under standardized and reproducible conditions, thereby making it possible to match, or duplicate, any known color quickly and with a degree of accuracy not attainable heretofore with apparatus of this type. The apparatus is also susceptible of use in originating colors and making their reproduction possible at any time from data obtained by prior use of the apparatus.

The main object of the invention is, therefore, to provide a color scanning or viewing apparatus simple in structure, and accurate in color matching and analyzing.

Another object is the provision of apparatus which permits color analysis under standard conditions which may be duplicated at any time and at various locations.

Still another object is the provision of apparatus wherein the components of a color to be analyzed or synthesized may be charted and made the basis of a permanent record.

Other objects and advantages of the invention will be apparent from the following specification when read in conjunction with the accompanying drawings, in which:—

Figure 1 is a perspective view, with parts broken away, of one form of scanning apparatus which may be utilized in practicing this invention;

Fig. 2 is a central vertical section through the apparatus shown in Fig. 1;

Fig. 3 is a detail plan view of a Maxwell disc assembly placed in position on a rotatable calibrated scale;

Fig. 4 is a detail perspective view of two Maxwell discs in coaxial overlapping relation, and removed from the support of Fig. 3;

Fig. 5 is a perspective view, with parts broken away, of an adjustable screen suitable for use in the apparatus shown in Figs. 1 and 2;

Fig. 6 is a partial sectional view showing a detail of the mounting and actuating mechanism for the screen shown in Fig. 5; and Fig. 7 is a diagram showing the electric circuits within the scanning apparatus.

In the drawings, the reference character 11 designates a cabinet designed to house one form of scanning apparatus suitable for use in practicing this invention. This cabinet is preferably lined with black velvet on the interior to prevent undesired light reflections, and contains several partitions which divide the cabinet into a plurality of chambers. For example, a partition 12 is secured to the bottom 13 and the rear wall 14 of the cabinet. Side walls 10 on partition 12 cooperate with the walls of the cabinet to form a motor compartment. The partition 12 and the parts carried thereby may be conveniently removed from the cabinet. Partitions 29 and 31 are arranged to form a lamp chamber, a chamber for the electric cord, and a chamber forming a scanning tube or unobstructed and closed line of sight between color discs to be scanned and a scanning opening in the cabinet. These elements will later be described in detail.

The partition 12 carries a right angle bracket 15 upon which a motor 16 is mounted with its axis at right angles to the partition 12. This motor has an elongated shaft 17 threaded at its outer end and carrying, in rigid fixed relation thereon, a support 18.

Another fixed and permanent part of this mechanism may be a graduated disc 19 (see Fig. 3) which is divided up into twenty equal spaces numbered from five to one hundred, and each of these spaces is, in turn, divided into five smaller spaces. The Maxwell discs, designed to be used with the graduated disc 19, are of well known construction and consist of colored discs 21, each of which is perforated centrally at 22 to embrace the shaft 17, and contains a radial slit 23 extending from the perforation 22 to the periphery of the disc.

By reason of this construction, several appropriately colored discs may be overlapped, as shown in Fig. 4, and by relative rotation of the same the proportions of any particular color or colors visible may be varied. When two or more of the discs are overlapped, as shown in Fig. 4, they may be placed on top of the graduated disc 19, a sample disc 24 of the color to be matched placed on top of them, and then the securing nut 25 screwed down onto the shaft 17, whereby the discs 19, 21 and 24 are securely fixed to the motor shaft. Alternatively a large sample disc of the color to be matched may be employed, and smaller color discs placed on top of it. This latter arrangement avoids all possibility of frayed edges on a cloth sample forming a colored ring between the sample and color discs and thereby interfering with the matching process. Rotation of the discs will then cause the colors on discs 21 to blend into a single tone, in well known manner, and this composite color may be compared with that of sample disc 24.

The top of the cabinet 11 contains an opening 26 closed by a hinged door 27 having at its lateral sides flexible bellows connections 28 with the sides of the cabinet. When this door is open, as shown in the drawings, it cooperates with the two partitions 29 and 31 and the side walls of the cabinet to form a tubular passageway or scanning tube, the axis of which is parallel to the shaft 17 of motor 16, and through which the Maxwell discs may be viewed with reference to the graduated disc 19.

The cabinet 11 is also provided with hinged doors 32, each provided with suitable catches 33 and folding stay arms 34, whereby access may be had to the motor 16 and the disc structure associated therewith. Preferably, the apparatus is provided with an opaque screen 35 hinged at 36 on partition 29. This screen has depending legs 37 which contact with the partition 12 and hold the screen surface in parallel relation to that partition and to the planes of the Maxwell discs. The screen is perforated at 38 so that when the Maxwell discs are viewed, the field of view is limited to the area surrounded by the dotted lines in Fig. 3.

The screen 35 may be moved to the dotted line position when access to the discs is to be had. Inasmuch as it is not necessary to observe the graduations on the graduated disc 19 while the discs rotate, and a concentrated field of view is preferable, this screen 35 facilitates accurate observation of the discs and comparison of the color blend produced by those discs in relation to the sample 24 to be matched.

Disposed in the front or lamp compartment 39 of the cabinet and underneath the partition 31, is a light source in the form of an electric lamp 41 mounted on a base 42 carried by an angular support 43. The support 43 rests upon the bottom of the cabinet 11 at one end, while the other end is attached to a panel 44 at 45.

Associated with lamp 41 is a reflector 46 which directs the light from the lamp into the chamber where the Maxwell discs are located. The light passes through an opening 47 in an adjustable screen 48. This screen, which may be made removable, may comprise a frame 49 connected at its upper portion with the partition 31 and at the bottom resting on the bottom 13 of the cabinet 11. As here shown, the frame comprises two perforated plates 51 and 52 held in spaced relation by members 53 and 54. The opening 47 passes through both of the plates 51 and 52 and this opening is in direct line between the lamp 41 and the Maxwell disc 21.

Rotatably mounted between the plates 51 and 52 is a disc-like assembly carried on a shaft 55 terminating in a knob 56. Secured to the shaft 55 with the knob 56 is a member 57 having grooves in its upper and lower faces to receive two semi-circular sections of glass 58 and 59. One of these sections, for example 58, may be of opal diffusing glass, while 59 is of blue or filter glass, designed to impart daylight characteristics to light passing through it. A friction arm 61 on shaft 55 bears against the plate 51 to hold the screens in any desired adjusted position.

When the glass 58 is in registry with the openings 47, the rays from lamp 41 pass through the diffusing glass to the Maxwell discs and the observer views the discs under incandescent lamp light. When the knob 56 is rotated through 180° to place the glass section 59 in registry with the opening 47, the rays directed on the Maxwell discs will have daylight characteristics because the excess of yellow rays from the incandescent lamp will be absorbed by the blue glass. The effect obtained by the observer will be similar to that which would be obtained were he to examine the color discs by actual daylight. This adjustable screen affords a convenient means of varying the color quality of the light directed upon the discs to be scanned.

The panel 44 is preferably made accessible through an opening in one end of the cabinet 11, this opening being normally closed by a door 60. The panel is held in fixed relation to the partition 31 by means of an angle member 62 secured to the panel at 63 by a flange, and to the partition 31 by another flange 64. The space behind panel 44 may be ventilated by providing screened openings 76 and 77 in the two lateral walls of the cabinet.

Mounted on the panel 44 is a voltmeter 65, a rheostat 66 and two switches 67 and 68. The switch 68 controls the motor 16 through suitable connections. In a similar manner, switch 67 controls the circuit to the lamp 41. The electric circuits are indicated in the diagram of Fig. 7.

The voltmeter 65 and rheostat 66 are connected in circuit with the lamp 41 so that appropriate adjustment of rheostat 66 may be made to secure uniform illumination from the lamp 41 at all times, and to enable operators at various locations to always use the same voltage on the lamp and thus secure uniform light intensity, in spite of variations in the electric current which is available at their particular location.

It is desirable to provide the electric cord and plug 74 with a suitable automatic take-up so that the cord may not need to be folded up while the cabinet is being removed from one location to another or is being stored. Consequently, it is preferred to utilize the chamber 69 formed between the top and the walls of the cabinet 11 and the partition 29 as a repository for a take-up reel 70. This reel may be of any suitable construction and contains a spring 75 mounted within its casing.

The casing of the reel is secured to the top of the cabinet in movable relation thereto by a joint 71, and suitable connections may be carried from the cord to the mechanism within the cabinet. The end 14 of the cabinet opposite the chamber 69 contains an opening into which a cup-like insert 72 is placed. This insert is of dimensions sufficient to totally enclose the plug 74, but is perforated at 73 to permit a portion of the plug to extend through it, and to hold all parts of the plug and cord within the confines of the cabinet when the device is not in use.

According to the present invention, it has been found possible, by a suitable choice of approximately 90 standard colors, to duplicate almost any known color. Although at times it has been supposed that 132 color discs would be required to produce all color designations, I have found by experimentation and research that with the strong colors at present available, approximately 90 discs are sufficient, and that as the strength and purity of colors becomes perfected, it may even be possible to match all colors by the use of as few as 12 color discs. In any event, the best code now available consists approximately of 90 Maxwell discs of assorted colors.

It will be obvious that when it is desired to match a color in fabric, paint, printing ink or other material, the exact color desired can be obtained by selecting from the color discs above, the ones most closely resembling the sample to be matched. If the color is a light yellow, then a light yellow disc will be one of the colors desired for the matching operation. If the color is very pure, then obviously a grayed yellow will not serve as well as a pure yellow color disc. However, if there is no disc available which exactly matches the sample of merchandise to be reproduced, then it becomes necessary to make special disc colors or to select the two closest matching color discs available in the set of approximately 90 colors, and to arrange them on the graduated disc 19 in such relative proportions that when this disc is rotated, the blended color corresponds exactly to that which is to be matched. If an orange color is to be matched, this would come between yellow and red, since orange is composed of both red and yellow. If the color to be matched is a brown, then a disc of black combined with the red and yellow will resolve into brown when the discs are rotated rapidly. It will be obvious that several adjustments of the angularity of the discs will usually be required before an exact match can be obtained.

For the sake of accurate designation, the colors are listed below and the corresponding standard Munsell color notations also given. Inasmuch as I prefer to designate this system of color transmission "Colorcable", the color numbers according to my code will be listed under that heading:

| Colorcable | Munsell notation |
|---|---|
| 1 | Red 8/4 |
| 2 | Red 7/8 |
| 3 | Red 6/10 |
| 4 | Red 5/12 |
| 5 | Red 4/14 |
| 6 | Red 3/10 |
| 7 | Red 2/6 |
| 9 | Red 6R 5/18 |
| 10 | Yellow-red 8/4 |
| 11 | Yellow-red 7/10 |
| 12 | Yellow-red 6/12 |
| 13 | Yellow-red 5/10 |
| 14 | Yellow-red 4/8 |
| 15 | Yellow-red 3/4 |
| 16 | Yellow-red 2/2 |
| 18 | Yellow-red 5YR5.7/18 |
| 19 | Yellow 8/12 |
| 20 | Yellow 7/10 |
| 21 | Yellow 6/8 |
| 22 | Yellow 5/6 |
| 23 | Yellow 4/4 |
| 24 | Yellow 3/2 |
| 25 | Yellow 2/2 |
| 26 | Yellow 5.5Y8.2/16 |
| 27 | Green-yellow 8/8 |
| 28 | Green-yellow 7/10 |
| 29 | Green-yellow 6/8 |
| 30 | Green-yellow 5/8 |
| 31 | Green-yellow 4/6 |
| 32 | Green-yellow 3/4 |
| 33 | Green-yellow 2/2 |
| 34 | Green-yellow 5GY5.8/16 |
| 35 | Green 8/6 |
| 36 | Green 7/6 |
| 37 | Green 6/6 |
| 38 | Green 5/8 |
| 39 | Green 4/4 |
| 40 | Green 3/4 |
| 41 | Green 2/2 |
| 42 | Green 1G4.4/14 |
| 44 | Blue-green 8/2 |
| 45 | Blue-green 7/4 |
| 46 | Blue-green 6/6 |
| 47 | Blue-green 5/6 |
| 48 | Blue-green 4/6 |
| 49 | Blue-green 3/6 |
| 50 | Blue-green 2/4 |
| 51 | Blue 8/4 |
| 52 | Blue 7/6 |
| 53 | Blue 6/6 |
| 54 | Blue 5/6 |
| 55 | Blue 4/8 |
| 56 | Blue 3/6 |
| 57 | Blue 2/2 |
| 58 | Blue 10B2.6/12 |
| 59 | Purple-blue 8/2 |
| 60 | Purple-blue 7/6 |
| 61 | Purple-blue 6/8 |
| 62 | Purple-blue 5/10 |
| 63 | Purple-blue 4/10 |
| 64 | Purple-blue 3/12 |
| 65 | Purple-blue 2/6 |
| 66 | Purple-blue 5.5PB2.7/17 |
| 67 | Purple 8/4 |
| 68 | Purple 7/6 |
| 69 | Purple 6/8 |
| 70 | Purple 5/10 |
| 71 | Purple 4/12 |
| 72 | Purple 3/10 |
| 73 | Purple 2/6 |
| 74 | Purple 5P2.2/13 |
| 76 | Red-purple 8/6 |
| 77 | Red-purple 7/8 |
| 78 | Red-purple 6/10 |
| 79 | Red-purple 5/10 |
| 80 | Red-purple 4/12 |
| 81 | Red-purple 3/10 |
| 82 | Red-purple 2/6 |
| 82A | Red-purple 7.5RP4.1/18 |
| 83 | N9.4/ |
| 84 | N9/ |
| 85 | N8/ |
| 86 | N7/ |
| 87 | N6/ |
| 88 | N5/ |
| 89 | N4/ |
| 90 | N3/ |
| 91 | N2/ |
| 92 | N1/ |
| 93 | Glossy black |

A system of color transmission in which apparatus of the type shown and described herein will be found useful, is described and claimed broadly in my copending application Ser. No. 149,716, filed June 22, 1937.

The operation of the system described in the above application and using the apparatus just described will now be set forth in detail. By way of example, it will be assumed that a specific sample of blue wool material is in the hands of a person in the United States, and that person desires to match in Europe this blue wool material exactly so that all delay incident to sending an actual sample of the material to Europe may be avoided. The sender will assemble three Maxwell discs 21 on the calibrated disc 19 and will place on top of these discs a sample disc 24 of the blue wool which is to be matched in Europe. After these discs are clamped in position by the nut 25, the motor 16 will be rotated and the observer will look through the scanning opening 26 and ascertain whether or not the blending of the colors of the three discs 21 produces a color tone which is an exact match for the blue wool disc 24. If the match is not correct, the motor will be stopped and the discs 21 readjusted and another test made. These steps will be repeated until the blend of the three discs corresponds accurately to the coloring of disc 24. The readings on the calibrated disc 19 will then be taken in order to give the location of the radial slits 23 and these readings transmitted by cable or radio to the receiving station in Europe. The adjusted discs are shown in Fig. 3.

In the example given, the cablegram or radiogram may read, for example: Four sixty-two percent Sixty-seven twenty-four percent Fifty-eight fourteen percent.

When this message is received in Europe, the recipient will assemble on the calibrated disc 19 of his scanning apparatus disc #4, disc #67 and disc #58, with the discs arranged so as to make visible from the scanning opening 62% of #4, 24% of #67 and 14% of #58. When these discs are now rotated, the color blend will be an exact reproduction of the blue wool sample which the purchaser in the United States desires to duplicate. It will be obvious that any desired color combination may be duplicated instantly by the use of this apparatus, and that any color may be originated by suitable arrangement of Maxwell discs of appropriate color.

It will be understood that practice of the invention is not necessarily limited to the use of the particular number of color discs indicated above. It is only necessary that the apparatus used include sets of discs and viewing apparatus in order that conditions may be reproduced.

Although only one form of color analyzing apparatus has been described and illustrated, it will be obvious that changes and modifications may be made in the details, within the scope of the claims, without departing from the spirit and scope of the invention.

What is claimed is:—

1. A viewing device comprising a cabinet having a plurality of partitions therein disposed to form a motor chamber, a lamp chamber and a sight tube; a motor in said motor chamber and having a shaft projecting into said sight tube; a graduated disc mounted on said shaft; a lamp in the lamp chamber for directing light along a line disposed at an angle of substantially 45 degrees with respect to the plane of said disc, and at approximately the same angle with respect to the axis of said sight tube; and means in the electric circuits of the lamp and motor for regulating the same.

2. A viewing device for color analysis comprising a cabinet having a plurality of partitions therein disposed to form a motor chamber, a lamp chamber and a sight tube; a motor in said motor chamber and having a shaft projecting into said sight tube; a graduated disc mounted upon said shaft; and a lamp in the lamp chamber for directing light along a line disposed at an angle of substantially 45 degrees with respect to the plane of said disc, and at approximately the same angle with respect to the axis of said sight tube.

3. A viewing device for color analysis comprising a cabinet having a plurality of partitions therein disposed to form a motor chamber, a lamp chamber and a viewing tube; a motor in said motor chamber and having a shaft projecting into said viewing tube; a graduated disc mounted upon said motor shaft; a lamp in the lamp chamber for directing light along a line disposed at an angle of substantially 45 degrees with respect to the plane of said disc, and at approximately the same angle with respect to the axis of said viewing tube; means in the electric circuit of the motor and lamp for regulating said lamp and motor; electric cord take-up means mounted within said cabinet outside of the chambers aforesaid; and means for connecting said cord with said lamp and motor.

4. A viewing device comprising a cabinet having a plurality of partitions therein disposed to form a motor chamber, a lamp chamber and a sight tube; a motor in said motor chamber and having a shaft projecting into said sight tube; a graduated disc mounted on said shaft; a lamp in the lamp chamber for directing light along a line approximately bisecting the angle between the axis of the tube and the plane of the disc; a door for closing the outer end of the sight tube; and means affording access to the motor chamber and to the end of said sight tube where said disc is located.

5. In a viewing device for color analysis, a cabinet; a motor in said cabinet; a calibrated disc mounted on the shaft of said motor, and adapted to receive Maxwell color discs in overlapping relation thereon; means for securing a color sample to said disc in superposed relation to the calibrated and Maxwell discs; a light source in the cabinet, said source being so disposed as to direct light upon said discs; a sight tube substantially coaxial with the calibrated disc and providing a free and unobstructed line of sight between the exterior of said cabinet and the space in which said disc is located; a frame having a perforation for limiting the field of view of said discs, said frame being pivotally mounted in said sight tube, and having two positions, in one of which it is out of the line of sight of said discs, and in the other of which said perforation is aligned with said discs to limit the field of view thereof; a color screen mounted in said cabinet between said light source and said disc, said screen being made up of a plurality of sections having different light transmitting characteristics and adjustable to position a selected section in the light path; and means for varying the intensity of the light source.

6. A viewing device for color analysis comprising a cabinet having a plurality of partitions therein disposed to form a lamp chamber and a sight tube; a combined color disc and sample supporting means rotatably disposed in said tube; a motor in said cabinet; a driving connection between said disc and sample supporting means, and said motor; a lamp in the lamp chamber for directing light onto said disc and sample supporting means along a line approximately bisecting the angle between the axis of the tube and the plane of the supporting means whereby substantially only light reflected diffusely from said disc and sample supporting means passes through said tube; and current regulating means in circuit with said lamp for varying the intensity of the light transmitted.

7. A viewing device for color analysis comprising a cabinet having a plurality of partitions therein disposed to form a motor chamber, a lamp chamber, and a sight tube; a motor in said motor chamber; a combined color disc and sample supporting means rotatably disposed in said tube and having a driven connection with said motor; an incandescent lamp in the lamp chamber for directing light onto said disc and sample supporting means at an angle such that the light is reflected from said disc and sample supporting means into said tube; a screen mounted between said lamp chamber and said disc and sample supporting means, said screen being made up of a plurality of sections having different light transmitting characteristics, one section being adapted to give the transmitted light rays daylight characteristics and another section adapted to transmit light from said lamp without changing its incandescent lamp characteristics, and said screen being adjustable to position a selected section thereof between the lamp and the sample supporting means; means carried by said cabinet for controlling the circuit of the lamp to vary the light intensity; and other means carried by said cabinet for controlling the circuit of said motor.

HOWARD KETCHAM.